United States Patent [19]

Bahder et al.

[11] 3,943,271

[45] Mar. 9, 1976

[54] EXTRUDED SOLID DIELECTRIC HIGH VOLTAGE CABLE RESISTANT TO ELECTRO-CHEMICAL TREES

[75] Inventors: George Bahder, Edison; George S. Eager, Jr., Upper Montclair; David A. Silver, Livingston, all of N.J.

[73] Assignee: General Cable Corporation, Greenwich, Conn.

[22] Filed: May 6, 1974

[21] Appl. No.: 467,607

[52] U.S. Cl...... 174/23 R; 174/102 SC; 174/102 D; 174/105 SC; 174/110 PM
[51] Int. Cl.² .................... H02G 15/20; H01B 7/18
[58] Field of Search.. 174/36, 102 R, 102 D, 106 D, 174/107, 102 SC, 105 SC, 106 SC, 120 SC, 120 AR, 120 SR, 23 R, 114 R, 116, 110 AR, 110 PM, 108, 109

[56] References Cited
UNITED STATES PATENTS

| | | | |
|---|---|---|---|
| 2,427,507 | 9/1947 | Powell et al. | 174/114 R |
| 2,479,924 | 8/1949 | Gillis | 174/107 X |
| 2,589,700 | 3/1952 | Johnstone | 174/106 D |
| 2,688,652 | 9/1954 | Schumacher | 174/102 D |
| 2,995,616 | 8/1961 | Nicolas | 174/102 D |
| 3,180,926 | 4/1965 | Trill | 174/107 |
| 3,433,687 | 3/1969 | Price | 174/102 D X |
| 3,485,938 | 12/1969 | Kingsley | 174/107 |
| 3,507,978 | 4/1970 | Jachimowicz | 174/105 R |
| 3,534,149 | 10/1970 | Peacock et al. | 174/105 R |
| 3,557,301 | 1/1971 | Priaroggia | 174/102 D |
| 3,602,632 | 8/1971 | Ollis | 174/36 |
| 3,617,377 | 11/1971 | Isshiki et al. | 174/107 UX |
| 3,638,306 | 2/1972 | Padowicz | 174/107 |
| 3,643,004 | 2/1972 | McKean | 174/36 |
| 3,651,244 | 3/1972 | Silver et al. | 174/36 |
| 3,657,809 | 4/1972 | Lehnert | 174/107 |
| 3,681,515 | 8/1972 | Mildner | 174/107 |
| 3,748,369 | 7/1973 | Durakis et al. | 174/36 |
| 3,754,094 | 8/1973 | Ziemek et al. | 174/102 D X |
| 3,792,192 | 2/1974 | Plate | 174/107 X |

FOREIGN PATENTS OR APPLICATIONS

| | | | |
|---|---|---|---|
| 205,393 | 5/1956 | Australia | 174/116 |

OTHER PUBLICATIONS

Electrical World, May 1971, p. 134.
Scheffler, E., *Electrical Welded Thin Aluminum Envelopes and Their use In Cable Designs,* Wire & Wire Products, 4/70, pp. 82–85.

*Primary Examiner*—Arthur T. Grimley
*Attorney, Agent, or Firm*—Hopgood, Calimafde

[57] ABSTRACT

Extruded dielectric power cables installed underground have their life shortened by the formation of electrochemical trees in the insulation. Tree formation can be prevented if the insulation is initially dry and the cable construction is such that moisture cannot gain access to the insulation under operating conditions encountered during installation and underground use. This invention eliminates initial moisture and has a construction that greatly retards ingress of moisture to the insulation during installation when the cable is in service and prevents longitudinal movement of water along the cable due to accidental damage to the cable or electrical failure.

15 Claims, 6 Drawing Figures

U.S. Patent   March 9, 1976   3,943,271
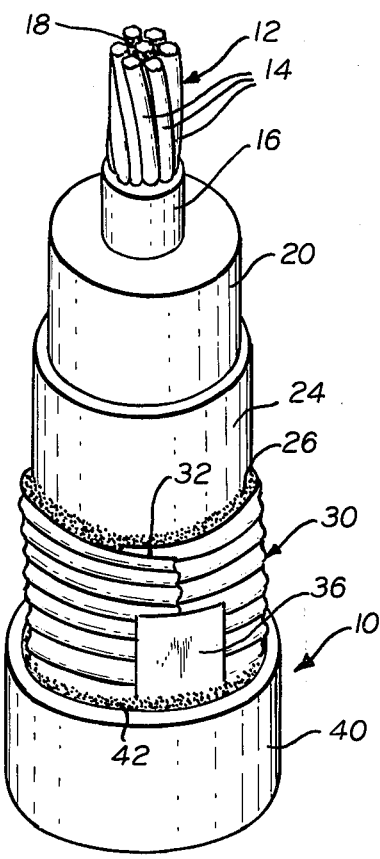
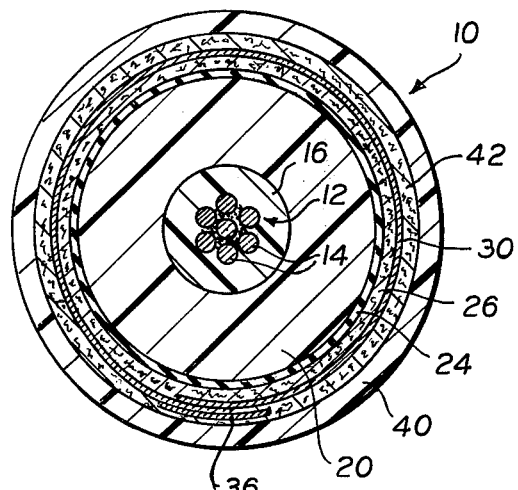
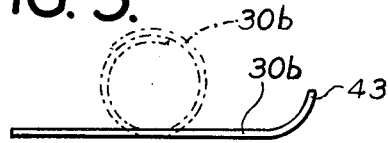
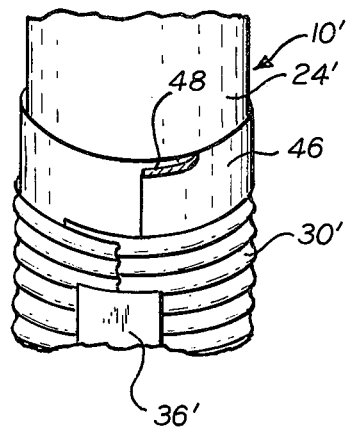
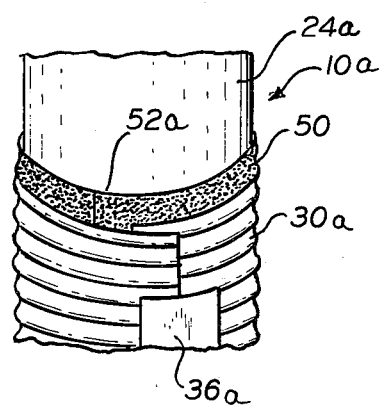
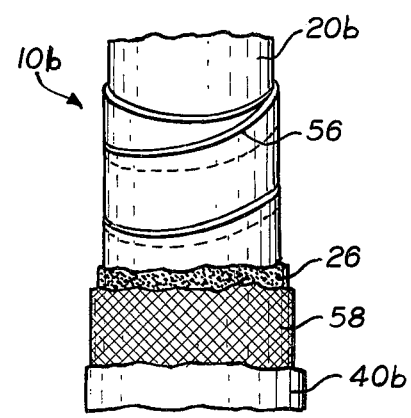

EXTRUDED SOLID DIELECTRIC HIGH VOLTAGE CABLE RESISTANT TO ELECTRO-CHEMICAL TREES

BACKGROUND AND SUMMARY OF THE INVENTION

Extruded solid dielectric cables installed underground over the last 15 years have been found to contain tree or bushlike patterns in the insulation. These patterns called "electrochemical trees" result from moisture penetration into the insulation under normal operating electrical stress due to high electrical stresses developed locally by insulation imperfections.

Under most operating conditions when extruded dielectric power cables are installed underground the ingress of moisture shortens the life of these cables prematurely because of the formation of these electrochemical trees in the insulation. These trees form at normal operating stress over a period of years depending somewhat on local environment and particular cable construction. The trees will not form if the insulation is initially dry or free of water and remains this way throughout its operating life. This condition can be achieved initially by an extruded lead sheath or other hermetic enclosure.

The trees represent channels which are filled with the liquid. The dielectric strength of the channels is lower than that of insulation. When the channels progress more than 50% throughout the insulation, the dielectric strength of the insulation is decreased to such an extent that electrical failure of the cable may occur under typical over-voltage conditions. Further progression of the channels into the insulation may cause failures at even operating voltages. The electrochemical trees are originated at insulation imperfections located within the insulation wall or at sharp irregularities at the interfaces of the insulation and the conductor and insulation shields. Typically, the electrochemical trees progress from high voltage stress areas caused by these imperfections into a low voltage stress area away from the imperfections.

As will be developed later, the purpose of this invention is to provide a special design of cable which, initially free of moisture in its components, is filled with moisture resistant materials to prevent sufficient moisture ingress and longitudinal movement during the active life of the cable to prematurely cause the cable to fail due to the formation of electrochemical trees.

Cables with extruded lead and aluminum sheaths have been used to prevent moisture ingress into the insulation and thereby retard the formation of electrochemical trees. Cables with welded sheaths, such as copper, aluminum and steel have also been used for the same purpose. However, these constructions have not been entirely satisfactory because moisture enters from the ends of the cable and at places where the sheath is damaged or has become corroded and progresses along the cable and into the insulation.

While these various expedients have been used to prevent moisture from getting into cables and destroying the effectiveness of certain types of insulation, such cable designs have not been effective in preventing the formation of electrochemical trees in the insulation over a period of years due to corrosion and damage to the metallic shield. In addition, metallic sheathed cables are high in cost, difficult to handle when large in diameter, and expensive to splice and terminate. This invention provides a combination of moisture repellent features that prevent or greatly delay the formation of electrochemical trees in power cable insulation and thereby extends substantially the useful life of the cable.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is an isometric view, with different parts broken away progressively along the length of a cable made in accordance with this invention;

FIG. 2 is an enlarged sectional view taken on the line 2—2 of FIG. 1;

FIG. 3 is a detail view, similar to FIG. 1, but showing a modified construction of a portion of the cable;

FIG. 4 is a view similar to FIG. 3 but showing a second modified form of the invention;

FIG. 5 is a diagrammatic sectional view showing how the strip for the longitudinally folded strip can be preformed to obtain a better seam; and FIG. 6 shows a modified construction with a braided wire metal shield and flooding compound over a helically wrapped semi-conducting tape insulation shield.

DESCRIPTION OF PREFERRED EMBODIMENT

FIG. 1 shows a power cable 10 which includes a center conductor 12 made up of a plurality of strands 14 which are cabled together and covered by a semi-conducting conductor shield 16 such as in conventional with high voltage power cables. The space between strands 14 is filled with a filling compound which constitutes a strand sealant indicated by stippling and designated by the reference character 18 in FIG. 1. This sealant 18 completely fills all spaces between the strands 14 so that there can be no moisture in the strands when the stranded conductor 12 is covered by the conductor shield 16.

The conductor shield 16 is preferably extruded over the conductor 12 and there is sufficient sealant 18 on the conductor 12 so that as the shield 16 is extruded over the conductor, all space between the conductor strands and the shield 16 are filled with sealant surrounding the conductor and preventing any moisture from being in the space surrounded by the shield 16. The extruded material forming the conductor shield 16 extends into contact with the filled conductor and comes into contact with the sealant. The extruded shield 16 extends into the depressions between outside strands 14, as shown in FIG. 2. The shield 16 fits so tightly around the conductor 12 that no moisture can penetrate along the interfaces between the inside surface of the shield 16 and the surfaces of the conductor 12.

The sealant 18 may be an asphalt/rubber or a polyester compound. These materials are named by way of illustration and are preferred materials; but it will be understood that other filling compound can be used as the sealant if it is compatible with the material of the semi-conducting shield 16 and the insulation 20. If desired, a semi-conducting tape can be placed over the strands of the conductor 12 and the shield 16 can be extruded over this tape. Such a tape can be used if necessary to reduce migration of any ingredients of the strand sealant into the conductor shield 16. When such a semi-conducting tape is used, all spaces between it and the conductor are thoroughly filled with the sealant 18 and adheres to the semi-conducting shield 16. In place of the semi-conducting shield 16 a layer of high dielectric constant material can be used to serve as the stress control layer.

The conductor shield 16 is preferably polyethylene, cross-linked polyethylene, ethylene-propylene rubber (EPR) or a blend of these materials. The shield is made conducting by the use of carbon black, and it is resistant to the longitudinal migration of moisture or it may be a high dielectric constant stress control material.

Insulation 20 is then extruded over the conductor shield 16. The insulation 20 is preferably polyethylene or cross-linked polyethylene and it is this insulation that is protected against the formation of electrochemical trees. Other suitable insulation can be used such as ethylene-propylene rubber and polyvinyl chloride.

The insulation 20 is extruded tightly over the conductor shield 16 or stress control layer and bonded to it. It is not possible for moisture to penetrate along the interface between the insulation 20 and the conductor shield 16 from cable ends.

An insulation shield 24 is extruded directly over and bonded to the insulation 20. This insulation shield 24 is tightly extruded and because of the tight extrusion and fusion bonding, no moisture can penetrate along the interface between the insulation 20 and shield 24. Shield 24 is preferably made of the same material as the conductor shield 16.

There is a semi-conducting filler material 26 placed over the outside surface of the semi-conducting insulation shield 24. This semi-conducting filler 26 sticks to the insulation shield 24; and it may be made of the same material as the sealant 18 which is used in the conductor 12, but with the addition of carbon black or other conducting material in sufficient quantity to make the material 26 a semi-conductor.

The purpose of the semi-conducting filler 26 is to provide moisture resistance around the outside of the insulation shield 24. The filler 26 is compatible with the insulation shield 24 and the insulation 20.

A metallic shield 30 surrounds the insulation shield 24 outside of the filler 26 and is wrapped around the insulation shield 24 in such a way that the filler 26 occupies any space between the insulation shield 24 and the metallic shield 30. The metallic shield 30 is preferably made of aluminum or copper. It is preferably applied by folding it longitudinally around the insulation shield 24, and it is preferably corrugated to permit easier bending of the cable 10. This longitudinally folded metallic shield 30 has a lap seam indicated by the reference character 32 and is preferred over the conventional tape shield applied helically around the insulation shield because the longitudinally folded lap seam metallic shield 30 permit expansion of the cable core as the result of thermal cycling. A helically wound tape applied to a cable core cannot adequately provide for such thermal expansion and subsequent contraction and for handling high fault currents typical of electric utility transmission and distribution systems.

The edges of the metallic shield 30 at the lap seam 32 are free to move circumferentially with respect to one another when the cable expands with increase in temperature; and the metal of the shield 30 again contracts to maintain its tight contact around the underlying core of the cable when the cable cools and contracts.

The lap seam metallic shield 30 with the space under it, including the corrugations, filled with the semi-conducting filler material 26 retards moisture ingress into any spaces between the insulation 24 and shield 30. Such an aluminum or copper shield 30 is preferred over lead as lead corrodes easily and builds up the diameter of the cable excessively.

At the lap seam 32 of the folded corrugated shield 30, there is preferably placed a bridging tape 36 which extends across the edge of the shield 30 that is on the outside of the seam 32. This bridging tape which may be made of Mylar (Polyethylene terephthalate) or a polyester prevents the outer edge of the lap seam 32 from indenting into an overall extruded outer jacket 40 which is extruded over the shield 30 and the bridging tape 36. This outer jacket 40 is preferably polyethylene compounded with ultra violet protecting agents to prevent damage by sunlight if the cable is exposed to sunlight. If desired, the overall jacket 40 can be made of polyvinyl chloride or chlorinated polyethylene. Its function is to provide mechanical protection for the cable prior to installation, during installation, and while in service.

There is a filler or flooding compound 42 applied over the metallic shield 30 and the bridging tape 36. This filler 42 serves as a sealant outside of the shield 30 just as the material 26 serves as a sealant inside the corrugated shield 30. The filler 42 can be made of the same material as the filler 26 and some of it can be applied to the lapped surfaces of the seam 32 and it is also applied to the shield 30 before the bridging tape 36 is placed along the seam 32. Thus all of the space, which might otherwise be open, between any corrugations of the metallic shield 30 and other components of the cable that confront these corrugations is filled with sealant 26 and/or 42. The sealant 42 must be compatible with the overall jacket 40; and it serves to prevent water or moisture from reaching the metallic shield in the event that the outer or overall jacket 40 becomes punctured.

FIG. 5 shows a preformed strip or metal shield 30b which has an edge portion 43 bent transversely out of the plane of the rest of the shield 30b so that when the shield is folded longitudinally around the cable, with the edge 43 on the outside of the lap seam, the edge portion of the lower edge portion of the lap and the bridging tape 36 is unnecessary. This preforming can be done to the flat strip or during the folding of the strip 30b. The edge portion is bent to a radius of curvature approximately equal to the radius of the outside surface of the insulation shield, and preferably slightly less.

FIG. 3 shows a modified construction for the cable of this invention. Parts of the cable of FIG. 3 which correspond with those of FIG. 1 are indicated by the same reference character with a prime appended. The cable 10' of FIG. 3 has an insulation shield 24' which is the same as the corresponding insulation shield in FIG. 1 and all parts of the cable inside of the insulation shield 24' are the same as the construction shown in FIG. 1.

The cable 10' of FIG. 3 differs from the cable shown in FIG. 1 in that it has a longitudinally folded tape 46 around the insulation shield 24' in place of the flooding compound 26 of FIG. 1.

This tape 46 is preferably made of aluminum foil coated on both sides with polyethylene and with the polyethylene adhered to the foil tenaciously by having reactive carboxyl groups in the polyethylene coating. The longitudinally folded tape 46 has a lap seam, indicated by the reference character 48, and the confronting edge portions of the tape 46 at the lap seam are preferably bonded together to make a moisture proof layer provided by the tape 46 which is mostly plastic and capable of expanding circumferentially as necessary to accommodate thermal cycling of the cable.

A metallic shield 30', similar to the shield 30 of FIG. 1 surrounds the folded tape 46 and has a bridging tape 36' over which an overall jacket is extruded as in the construction shown in FIG. 1. The folded tape 46 takes the place of the flooding material 26 of FIG. 1 in providing a moisture proof layer around the insulation shield. The cable 10' can be made with filler material, such as the material 42 of FIG. 1, around the outside of the shield 30' and the bridging tape 36'. The cable 10' can be made without any flooding material on the outside of the shield 30 if full reliance is going to be placed on the folded tape 46 for keeping moisture away from the insulation shield 24'.

FIG. 4 shows another modified form of the invention with parts corresponding to those of FIG. 1 indicated by the same reference character with an "a" appended. This construction of FIG. 4 differs from that shown in FIG. 3 in that a tape 50 made of uncured semi-conducting rubber is folded around the insulation shield 24a. This rubber tape 50 is relied upon to keep moisture from reaching the insulation shield 24a. The cable 10a has a corrugated metallic shield 30a with a bridging tape 36a surrounded by an outer jacket (not shown).

The semi-conducting uncured rubber tape 50 is folded with a lap seam, indicated by the reference character 52a and the rubber is soft enough to fill the corrugations of the underside of the folded corrugated metallic shield 30a. The tape 50 prevents longitudinal flow of water along the cable core.

Conventional shields such as helically applied tape and wire shields can be used but are less desirable than the longitudinally folded shield with lap seam. When wire shield is used only, the same conducting flooding compound 26 is used.

FIG. 6 shows a construction in which a cable 10b has extruded insulation 20b with a semi-conducting insulation shield having an overlapping tape 56 helically wrapped around the insulation 20b and adhered to the insulation 20b. A metal braided wire screen 58 is applied over the tape 56 and is flooded with sealant 26. An extruded jacket 40b surrounds the wire shield 58.

In connection with the construction shown in FIGS. 3, 4 and 6, it should be kept in mind that the invention is primarily intended to prevent moisture from reaching the insulation of the cable and forming, over a number of years, electrochemical trees within the insulation and reducing the ability of the insulation to withstand the high voltage stresses for which it is intended. The tape 46 of FIG. 3 and the rubber tape 50 of FIG. 4 do provide protection from ingress of moisture to the cable core. However, the construction shown in FIG. 1 is the preferred embodiment in that it provides added protection against the ingress of moisture into the cable by means of flooding compound or sealant 42 between the overall jacket 40 and the metallic shield 30 and also by the sealant or flooding material 26 between the metallic shield 30 and the insulation shield 24.

The preferred embodiment of the invention and some modifications have been illustrated and described, but other modifications can be made and some features can be used in different combinations without departing from the invention as defined in the claims.

What is claimed is:

1. An electrical high voltage power cable for use underground including in combination a stranded conductor, a stress control layer forming a shield around and enclosing the conductor, a strand sealant that fills all spaces between the strands and any space between the strands and said stress control layer for preventing presence of moisture and water vapor within the stranded conductor and entrance of air and moisture through an end of the cable, and the strand sealant being semi-conducting, and an insulation system constructed so as to prevent the formation of electrochemical trees in the insulation, including an extruded solid polyethylene insulation layer tightly enclosing the stress control layer so that no moisture can enter at the ends of the cable at the interface between the insulation and the stress control layer, an extruded solid semi-conducting insulation shield tightly enclosing the insulation to prevent ingress of moisture between the insulation and the insulation shield, a metallic shield enclosing the semi-conducting insulation shield, and additional sealant comprising a semi-conducting compound between the insulation shield and the metallic shield and filling any clearances between the insulation shield and the metallic shield for preventing moisture that passes inward beyond the metallic shield from reaching the insulation shield, the sealant being chemically and physically compatible with the stress control layer and with the insulation shield and being a compound, and that maintains its physical and electrical characteristics in spite of the temperature caused by the load cycling of the power cable.

2. The electrical power cable described in claim 1 characterized by an outer protecting jacket surrounding the metallic shield and compatible with the sealant compound, and sealant between the metallic shield and the outer jacket.

3. The electrical power cable described in claim 1 characterized by the metallic shield being longitudinally folded around the insulation shield and having longitudinally extending edges forming a lap seam at which the edges can move over one another to expand and contract the diameter of the cable with change in temperature.

4. The electrical power cable described in claim 3 characterized by an outer plastic jacket surrounding the metallic shield, the outer edge portion of the lap seam having a permanent set different from the rest of the shield, and that imparts a curvature that causes the edge of said outer edge portion to hug the surface of the metal shield and thereby avoid movement of the outer edge into indenting engagement with the inside surface of the outer jacket.

5. The electrical power cable described in claim 3 characterized by the metal shield having corrugations extending in directions having substantial circumferential components, a bridging tape covering the lap seam and extending circumferentially on both sides thereof to prevent indentation of the seam edges into the overall extruded jacket, and the sealant compound located on both the inside and outside of the metallic shield being compatible with the material of the overall shield.

6. The electrical power cable described in claim 1 characterized by the strand sealant being asphalt rubber, the insulation being from the group consisting of polyethylene, cross-linked polyethylene, and ethylene propylene rubber, the insulation shield being from the group consisting of polyethylene, cross-linked polyethylene and ethylene-propylene rubber, and a blend of these materials, said insulation shield being made semiconducting by the addition of carbon black.

7. The electrical power cable described in claim 1 characterized by the sealant having carbon black dispersed therein to make the sealant semi-conducting.

8. The electrical power cable described in claim 1 characterized by the plastic coating on the metal foil being polyethylene containing reactive carboxyl groups greatly increasing the adhesion of the polyethylene to the metal foil.

9. The electrical power cable described in claim 1 characterized by the means between the insulation shield and the metallic shield, for preventing moisture that passes inward beyond the metal shield from reaching the insulation shield comprising an uncured semi-conducting rubber tape.

10. The electrical power cable described in claim 9 characterized by the semi-conducting rubber tape being folded longitudinally around the insulation shield with the edges of the rubber tape overlapped along the seam of the longitudinally folded tape.

11. The electrical power cable described in claim 9 characterized by the metallic shield being corrugated with corrugations that extend in directions having a longitudinal component, the tape having sufficient resilience to extend into the spaces within the corrugations, and the tape being under pressure sufficient to prevent flow of water between the semi-conductive insulation shield and the inside surface of the corrugated metallic shield.

12. The electrical power cable described in claim 1 characterized by a semi-conducting tape surrounding the conductor, under an extruded semi-conducting layer that surrounds the stranded conductor, for reducing migration of any ingredients of the strand sealant into the conductor shield.

13. The electrical power cable described in claim 1 characterized by the metallic shield being formed of metal from the group consisting of lead and aluminum, and an extruded overall plastic jacket shield around the metal shield, any space between the shields being filled with the sealant compound to block longitudinal migration of water therein.

14. The electrical power cable described in claim 1 characterized by the metal shield being formed of corrugated metal from the group consisting of copper, aluminum and steel, and an extruded overall plastic jacket shield around the metallic shield, any space between the shields having sealant therein to block longitudinal migration of water.

15. The electrical power cable described in claim 1 characterized by the metallic shield including a helically applied layer of wire.

* * * * *